Sept. 5, 1967   D. A. BRADLEY ET AL   3,340,453
METHOD OF COMMUTATING AND APPARATUS FOR
COMMUTATING AN INVERTER
Filed June 15, 1964   2 Sheets-Sheet 1

United States Patent Office 3,340,453
Patented Sept. 5, 1967

3,340,453
METHOD OF COMMUTATING AND APPARATUS FOR COMMUTATING AN INVERTER
David A. Bradley, Christopher D. Clarke, and Rex M. Davis, Loughborough, England, assignors to Brush Electrical Engineering Company Limited, Loughborough, England
Filed June 15, 1964, Ser. No. 375,279
Claims priority, application Great Britain, June 19, 1963, 24,300/63
6 Claims. (Cl. 321—5)

ABSTRACT OF THE DISCLOSURE

An electrical circuit for commutating a bridge inverter, that is supplied with a D.C. voltage and feeds a load having a lagging power factor, has at least four switching elements which can be turned off by applying a reverse voltage pulse across them and which are arranged in two equal groups, each of which is fed at a different D.C. potential. The commutation circuit has a commutating capacitor and an auxiliary D.C. supply, and a bridge rectifier carries the load current when it is not supplied by the inverter.

---

The invention relates to a method of commutating a bridge inverter of the kind that is to be supplied with a D.C. voltage and has at least four switching elements which can be turned off by applying a reverse voltage pulse across them, and are arranged in two equal goups so that each group will be connected to a separate D.C. supply line of different potential. The invention also relates to an inverter commutating apparatus of the kind comprising the combination of a commutation circuit, a bridge rectifier, and a bridge inverter having at least four switching elements which can be turned off by applying a reverse voltage pulse across them and are arranged in two equal groups, the inverter being adapted to feed a load having a lagging power factor, the commutation circuit including a commutating capacitor which is controlled by at least two commutator switching elements so that a momentary reverse voltage is applied across the inverter switching elements in synchronism with the operation of the inverter, and the bridge rectifier arranged to carry the load current during the periods when it is not supplied by the inverter.

With our co-pending United States patent application No. 222,428, we have taught that a bridge inverter of the kind set forth may be commutated by a single capacitor operating simultaneously on the D.C. supply lines thus providing numerous advantages over the well-known methods of commutation in which a separate commutating capacitor is connected to each A.C. phase of the inverter. In addition to using a single capacitor operating on the D.C. supply lines, we taught that a bridge rectifier should be used to provide a path through which the reactive currents from the inductive load may flow so that a reverse voltage can be established across the inverter switching elements. Furthermore we taught that a choke should be interposed between each D.C. supply line and the D.C. terminals of the inverter in order to accommodate the very large difference in potential between the D.C. supply lines and the D.C. terminals of the inverter during the commutation process. We have also taught that an auxiliary D.C. voltage supply should be used in conjunction with the normal charge to which the commutating capacitor is subject during commutation so as to provide a reverse voltage for extinguishing the inverter switching elements. However, we also taught that the commutating capacitor should be controlled so that the positive D.C. terminal of the inverter is momentarily taken to a potential more negative than the negative D.C. supply line whilst simultaneously the negative D.C. terminal of the inverter is momentarily taken to a potential more positive than the positive D.C. supply line. In this manner the necessary reverse voltage for extinguishing any inverter switching element that has been turned off will be simultaneously applied to every inverter switching element. The term "turned off" is used to denote the removal of gate current from a switching element, and the term "extinguished" denotes that the switching element has recovered its ability to block forward voltage. Thus, a commutating reverse voltage pulse will be delivered simultaneously to every inverter switching element in each group although only one inverter switching element of one of the groups is required to be extinguished.

An object of the present invention is to provide an improved method of commutation and a commutating circuit for achieving this method.

According to one aspect of the invention the method of commutating a bridge inverter, of the kind that is to be supplied with a D.C. voltage and has at least four switching elements which can be extinguished by applying a reverse voltage pulse across them and are arranged in two equal groups so that each group will be connected to a separate D.C. supply line of different potential, includes applying a reverse voltage pulse from a commutating capacitor and an auxiliary D.C. supply firstly to at least one inverter switching element of one group and secondly to at least one inverter switching element of the other group in synchronism with the operation of the inverter whereby a reverse voltage pulse will be applied to each inverter switching element when it is to be extinguished, maintaining the initial amplitude of the reverse voltage pulse substantially constant irrespective of variations in the D.C. supply, and maintaining the current flowing in the commutating capacitor until it is suitably charged ready for providing the next reverse voltage pulse. With the method of commutation disclosed in our said co-pending patent application, the choke windings interposed between each D.C. supply line and the D.C. terminals of the inverter must withstand a large voltage at every commutation. This large voltage injects electrical energy into both of the chokes at every commutation and this energy must either be subsequently dissipated in resistors or the commutation circuit must be made far more complex so that this energy may be recovered. However, when a bridge inverter having a choke in each D.C. supply line is commutated according to the method of the present invention, the two groups of inverter switching elements are commutated alternately and thus the number of commutating pulses applied to each choke is reduced to one half. In this manner the power losses incurred by the commutating pulses are reduced to substantially one half and some of the commutator circuit components can be made of substantially lower rating with a consequent saving in cost.

According to another aspect of the invention apparatus for performing the method of the invention is provided by the combination of a commutation circuit, a bridge rectifier and a bridge inverter having at least four switching elements which can be extinguished by applying a reverse voltage pulse across them and are arranged in two equal groups so that each group will be connected to a separate D.C. supply line of different potential, in which the inverter is adapted to feed a load having a lagging power factor, a commutating capacitor has one plate associated with both D.C. supply lines through a smoothing capacitor and has the other plate connected by a first series circuit to an inverter switching element of one group and by a second series circuit to an inverter switching element of the other group, each series circuit includes an auxiliary voltage supply and a commutator switching element whereby a reverse voltage pulse derived from the commutating capacitor and the auxiliary voltage supply is applied to extinguish any of the inverter switching elements when the appropriate commutator switching element is fired to complete the series circuit for supplying that inverter switching element, the commutator switching elements are arranged to be fired so that a reverse voltage pulse is applied alternately to each group of inverter switching elements in synchronism with the operation of the inverter so that any inverter switching element that has been turned off will be appropriately extinguished, the commutator switching elements are not extinguished until the commutating capacitor is suitably charged ready for providing the next reverse voltage pulse, and the bridge rectifier is connected between the D.C. supply lines and the A.C. terminals of the inverter for carrying the load current during the periods when it is not supplied by the inverter.

According to one feature the commutating capacitor may be connected by the first series circuit to one D.C. supply line intermediate a choke and one D.C. terminal of the inverter to which one group of inverter switching elements are connected so that when the commutator switching element in the first series circuit is fired a reverse voltage pulse will be applied to all of the inverter switching elements constituting the said one group, the commutating capacitor is connected by a second series circuit to the other D.C. supply line intermediate another choke and the other D.C. terminals of the inverter to which the other group of inverter switching elements are connected so that when the commutator switching element in the second series circuit is fired a reverse voltage pulse will be applied to all of the inverter switching elements constituting the said other group, and a separate circulating current return path is provided in parallel with each of the chokes. In this manner the two groups of inverter switching elements are commutated alternately and thus the number of commutating pulses applied to each choke is reduced to one half, thereby reducing the power losses and the cost of components as aforesaid. In such a case the time constant of each circulating current return path is preferably made sufficiently short as to enable the inverter to operate at high frequencies.

According to a preferred feature of the invention the A.C. side of each inverter switching element of one group is connected to the A.C. side of an inverter switching element of the other group through a choke of which a centre tapping provides an A.C. terminal of the inverter, the bridge rectifier is divided into two equal portions, one of these portions is connected between the first series circuit and a series of tappings each arranged operatively between the A.C. side of an inverter switching element of one group and its associated choke, the other portion of the bridge rectifier is connected between the second series circuit and a series of tappings each arranged operatively between the A.C. side of an inverter switching element of the other group and its associated choke, and the first and second series circuits are clamped respectively to the D.C. supply lines of the said other and the said one group of inverter switching elements. In this manner the reduction in the cost of components is substantially the same, but the commutating power loss is virtually eliminated as will be appreciated later on from the specific description.

According to yet another feature the A.C. side of each inverter switching element of one group may be connected to the A.C. side of an inverter switching element of the other group and to an A.C. terminal of the inverter, the first and second series circuits are connected to one A.C. terminal of the inverter, the remaining A.C. terminals of the inverter are each connected by a pair of parallel circuits to respective points in the first and second series circuits such that each parallel circuit may receive a reverse voltage pulse from the commutating capacitor and the auxiliary voltage supply irrespective of the condition of the commutator switching element in the said series circuit, a separate commutator switching element is arranged in series with each parallel circuit whereby each inverter switching element is individually and exclusively controlled by one commutator switching element, and the commutator switching elements are fired in synchronism with the operation of the inverter so that when an inverter switching element is to be extinguished an individual reverse voltage pulse is applied to it. With this feature chokes are completely eliminated but this saving must be set against the cost of the extra commutator switching elements. However, as no chokes are necessary, the associated circulating currents are eliminated and the current rating of the inverter is increased. Also the current rating of the commutating circuit can be reduced.

According to a still further feature the commutating capacitor may be split into two halves, one half of the commutating capacitor being connected between one D.C. supply line and a point between one terminal of a single auxiliary D.C. supply and the commutator switching element in the first series circuit, the other half of the commutating capacitor being connected between the other D.C. supply line and a point between the other terminal of the single auxiliary D.C. supply and the commutator switching element in the second series circuit, and a smoothing capacitor is arranged between the two D.C. supply lines. The commutating circuit may of course take the form of another "π" network having equivalent properties or of an equivalent "T" network.

The invention is now described, by way of example only, with reference to the accompanying drawings, in which.

Figure 1:
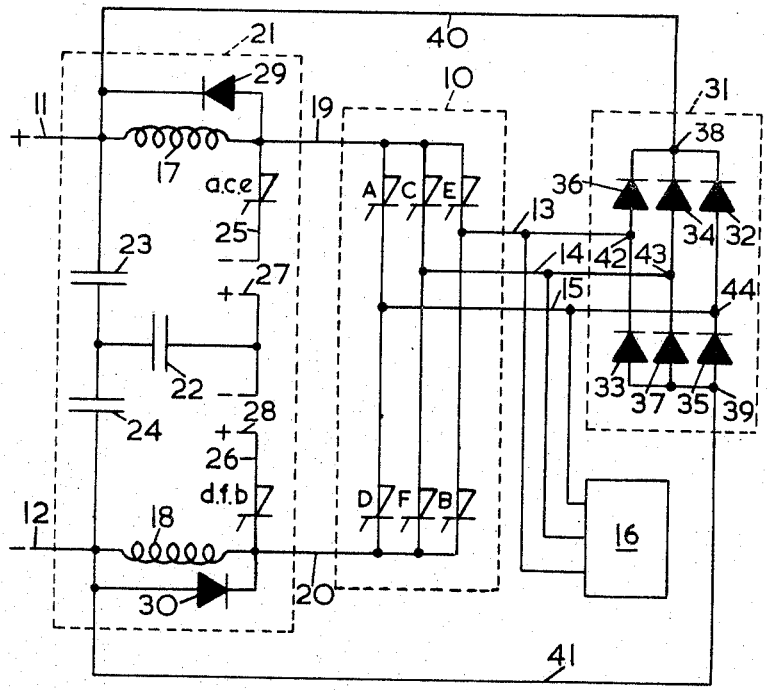
FIGURE 1 illustrates one form of apparatus for performing the method of the invention.

In FIGURE 1 a three phase bridge inverter 10 is supplied with load current from D.C. supply lines 11, 12 and is arranged to supply the three phases 13, 14, 15 which are connected to the load 16. The load current is conveyed from D.C. supply lines 11, 12 through respective chockes 17, 18 to the D.C. terminals 19, 20 of the inverter which has six inverter switching elements A, B, C, D, E, F arranged in two groups A, C, E and D, F, B connected respectively to D.C. terminals 19 and 20. These inverter switching elements are fired by appropriate gate signals in a well-known manner so that they are made conducting in threes in the following order $A+B+C$, $B+C+D$, $C+D+E$, $D+E+F$, $E+F+A$, $F+A+B$, repeated so that three correctly phased alternating voltages derived from the D.C. supply lines are applied to the load 16. In view of the order of firing of the inverter switching elements one fresh switching element is turned on and one switching element is turned off with each operation of the gating circuit. Also from the order of firing it will be seen that the switching element that is be turned off alternates between group A, C, E and group D, F, B. However, it is necessary to apply a momentary reverse voltage pulse across each switching element that is to be extinguished in addition to the removal of its gate signal by the customary inverter operating circuit. The duration of each reverse voltage pulse must be longer than the turn-off time of the inverter switching elements, and must be of sufficient value to ensure adequate turn-off time irrespective of wide variations in the load current.

The reverse voltage pulse required for extinguishing the inverter switching elements is derived from a commutation circuit 21 which includes a commutating capacitor 22 of which one plate is connected to both D.C. supply lines 11, 12 through two approximately equal smoothing capacitors 23, 24 of appreciably greater capacitance than the commutating capacitor 22. The other plate of the latter is connected to two series circuits 25, 26 which are respectively connected to the D.C. terminals 19, 20 of the inverter 10. The series circuit 25 includes an auxiliary voltage supply 27 and a normally non-conducting commutator switching element a.c.e., and the series circuit 26 includes an auxiliary voltage supply 28 and a normally non-conducting commutator switching element d.f.b.

The potential at the common connection of auxiliary supplies 27, 28 is determined by the charge on the commutating capacitor 22 and, before a reverse voltage pulse can be applied to the inverter switching elements A, C, E, the combined potentials of the commutating capacitor 22 and the auxiliary D.C. supply 27 must be sufficient to make the potential of the D.C. inverter terminal 19 negative with respect to the D.C. supply line 12. Assuming that the commutating capacitor 22 has the appropriate negative charge for this, when the commutator switching element a.c.e. is fired by the application of a gate signal, the potential of the D.C. inverter terminal 19 is taken rapidly to a value more negative than D.C. supply line 12 thus causing a reverse voltage to appear across all the switching elements A, C, E and rendering any conducting elements non-conducting. The commutator switching element a.c.e. is left in its conducting condition after the extinction of whichever of the inverter switching elements A, C, E has been turned off by the removal of its gate signal, so that the potential at the point common to the commutator switching element a.c.e. and the auxiliary D.C. supply 27 rises towards that of the D.C. supply line 11 by virtue of the continuation of current flow through the choke 17. The potential of this point is maintained at approximately the same value as that of the D.C. supply line 11 by a diode 29 forming a circulating current return path for the choke 17. At this point the commutator switching element a.c.e. is automatically rendered non-conducting leaving the potential at the common point between the auxiliary D.C. supply 27 and the commutator switching element a.c.e. positive with respect to the potential of D.C. supply line 11. The commutating capacitor 22 now has the appropriate positive charge for applying in conjunction with the auxiliary D.C. supply 28, a reverse voltage pulse across the inverter switching elements D, F, B by firing the commutator switching elements d.f.b. at the correct instant, and the commutating capacitor 22 will then be recharged with the initial negative potential from D.C. supply line 12 in the same manner as that described for the recharging at positive potential from D.C. supply line 11. To assist this a diode 30 is utilised to form a circulating current return path for choke 18. It will be appreciated that the gate control circuit for firing the commutator switching elements a.c.e. and d.f.b. must be driven in synchronism with the gate control circuit for firing and turning off the inverter switching elements A, B, C, D, E and F.

A bridge rectifier 31 has six return current diodes 32, 33, 34, 35, 36 and 37 arranged so that diodes 32, 34, 36 form one group and so that each diode of this group is connected to a diode in the other group 33, 35, 37. The outer terminals 38, 39 of the bridge are connected by respective lines 40, 41 to the D.C. supply lines 11, 12 and have their inner terminals 42, 43 and 44 connected respectively to phases 13, 14 and 15. In this manner the bridge rectifier 31 carries the load current during the periods when it is not supplied by the inverter 10, and also clamps the A.C. phases 13, 14, 15 to the D.C. supply lines 11, 12 to enable the commutating circuit 21 to operate satisfactorily.

If desired the auxiliary D.C. supplies 27 and 28 can change places with their respective commutator switching elements a.c.e. and d.f.b without affecting the operation of the commutating circuit. If desired the "T" network of the commutating circuit 21 illustrated in FIGURE 1 can be substituted by any other "T" network having similar properties and, as illustrated in FIGURE 2, it may be substituted by an equivalent "π" network.

Figure 2:
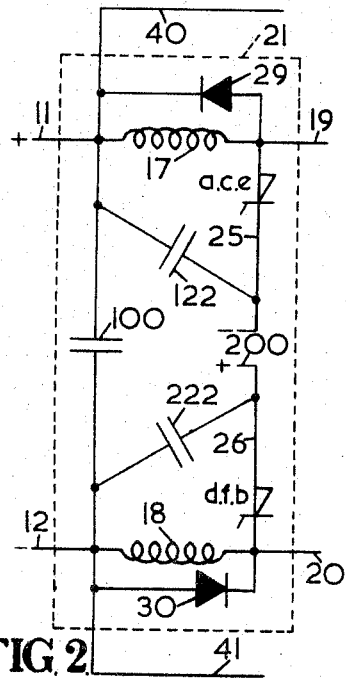
FIGURE 2 illustrates an equivalent "π" network for the commutating circuit.

In FIGURE 2 corresponding reference numerals have been used to indicate components that are common with FIGURE 1 and such components may be assumed as having the same function. The main difference is that the commutating capacitor 22 of FIGURE 1 has been substituted by two commutating capacitors 122 and 222 which have their one plates connected across a single auxiliary D.C. supply 200 and their other plates connected directly to the D.C. supply lines 11, 12 respectively which are interconnected by a single smoothing capacitor 100. The reverse voltage pulses are produced in precisely the same manner as that described with reference to FIGURE 1 except that the pulses delivered to each of the inverter D.C. supply terminals 19, 20 are now derived from both of the commutating capacitors 122 and 222 and from the auxiliary D.C. supply 200. Thus a reverse voltage pulse delivered to the inverter D.C. supply terminal 19 may be considered as emanating from a series circuit 25 including commutating capacitor 222, the auxiliary voltage supply 200 and the commutator switching element a.c.e., and from the associated parallel circuit including the commutating capacitor 122. Similarly a reverse voltage pulse delivered to the inverter D.C. supply terminal 20 may be considered as emanating from a series circuit 26 including commutating capacitor 122, the auxiliary voltage supply 200 and the commutator switching element d.f.b., and from the associated parallel circuit including the commutating capacitor 222. As the two commutating capacitors 122 and 222 have jointly to produce the same voltage pulse as the single commutating capacitor 22 of FIGURE 1 the cost of the commutating capacitors in both cases will be substantially the same. However, the commutating circuit shown in FIGURE 2 offers an advantage over that of FIGURE 1 as only one auxiliary D.C. supply 200 is required and the instantaneous current in the smoothing capacitor 100 is reduced to substantially one half.

Figure 3:
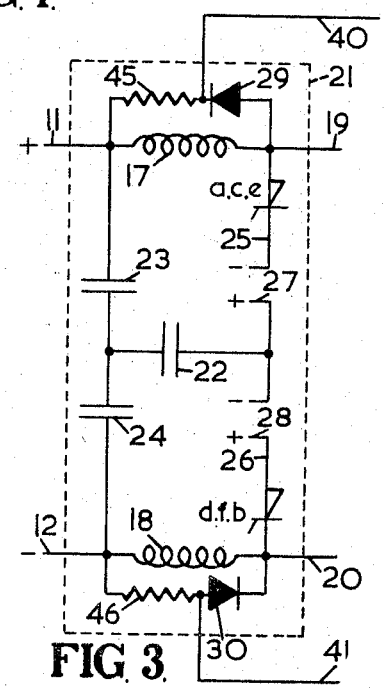
FIGURE 3 illustrates a modification of the commutating circuit illustrated in FIGURE 1.

With the circuits shown in FIGURES 1 and 2, the time constant of the circulating current return path from chokes 17 and 18 respectively through diodes 29 and 30 can impose a limit on the frequencies at which the inverter 10 can be operated. To overcome this problem the time constant is made shorter as shown in FIGURE 3 by inserting impedances 45 and 46 respectively between diodes 29 and 30 and the D.C. supply lines 11 and 12, and by re-arranging the lines 40 and 41 so that they are also connected to the D.C. supply lines through the impedances 45 and 46 respectively. These impedances may also be applied to the commutating circuit of FIGURE 2 or to any equivalent "T" or "π" network.

To generalise, the embodiment shown in FIGURES 1 to 3 presents the advantage over all prior proposals in that the chokes 17 and 18 have to withstand the momentary sum of supply and reverse commutating voltage only every alternate commutation of the inverter 10, thus materially reducing the circulating currents in the chokes and the problems associated with it. This reduction of the circulating current reduces substantially to one half the power losses previously associated with the generation of commutating pulses and presents a further saving in that lower rated components may be used. However with this embodiment, the inverter switching elements may under certain operating conditions have to withstand a high rate of rise of forward voltage which could have some limiting effect on the application of this embodiment. For this reason we prefer the embodiment illustrated in FIGURE 4.

Figure 4:
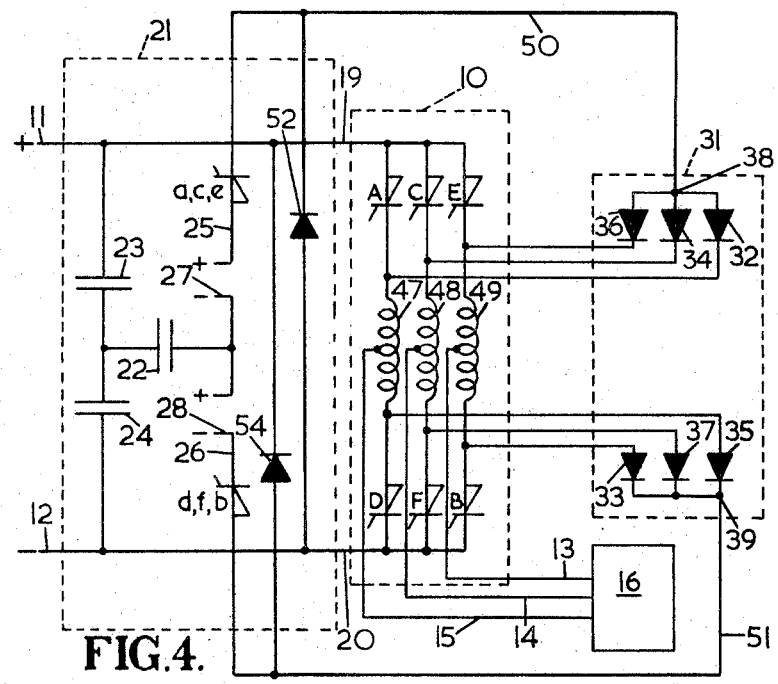
FIGURE 4 illustrates a preferred form of apparatus for performing the method of the invention.

In FIGURE 4 the same reference numerals have been used as in FIGURE 1 and all components bearing the same reference numeral may be considered as performing the same function unless specifically stated to the contrary. The D.C. supply terminals 11, 12 are directly connected to the D.C. inverter terminals 19 and 20 which, as previously, are connected to the groups of inverter switching elements A, C, E, and D, F, B, respectively. However inverter switching elements A and D, C and F, and E and B are interconnected by respective chokes 47, 48 and 49 which have respective centre tappings connected to the A.C. phases 15, 14 and 13. The commutating circuit 21 is of similar construction to that shown in FIGURE 1 but differs in that the commutator switching element a.c.e. is not connected to the inverter D.C. terminal 19, but is connected by a line 50 to the bridge rectifier 31 and through the diodes 32, 34 and 36 respectively to the common terminals between the inverter switching elements A, C and E and their associated chokes 47, 48 and 49. Similarly the commutator switching element d.f.b. is not connected to the inverter D.C. terminal 20, but is connected by a line 51 to the bridge rectifier 31 and through the diodes 35, 37 and 33 respectively to the common terminals between the inverter switching elements D, F and B and their associated chokes 47, 48 and 49. Furthermore line 50 is connected to D.C. supply line 12 through a clamping diode 52, and line 51 is connected to D.C. supply line 11 through a clamping diode 54.

The diodes of the bridge rectifier 31 assist both in the commutating function as will be appreciated later, and in providing an alternative path for currents associated with loads of lagging power factor. These alternative paths are completed by the diodes 52 and 54 as will presently be appreciated.

The commutating circuit 21 as before provides alternate reverse voltage pulses to series circuits 25 and 26 and, as a starting point, it will be assumed that the commutating capacitor 22 is charged so that the potential of the common terminal of the auxiliary D.C. supply 27 and the commutator switching element a.c.e. is positive with respect to the D.C. supply line 11. Thus, when the commutator switching element a.c.e. is fired, a reverse voltage pulse is applied to the inverter switching elements A, C and E through their respective diodes 32, 34 and 36 thereby extinguishing the inverter switching element that is to be extinguished.

With the operation of the inverter, the current flowing through at least one of the three chokes 47, 48 and 49 will be maintained so that the voltage across the commutating capacitor 22 decreases and then increases in the reverse direction until the line 50 reaches the potential of the D.C. supply line 12. When the commutator switching element d.f.b. is subsequently fired to extinguish an inverter switching element in group D, F, B, the commutating capacitor 22 will be charged at the potential of the auxiliary D.C. supply 28 plus the potential of the D.C. supply line 11 by the action of diode 54.

With the embodiment of FIGURE 4 no chokes are required in the D.C. supply lines 11 and 12 and thus all the commutation power losses associated therewith disappear. On the other hand a choke must be interposed between each pair of inverter switching elements A and D, C and F, and E and B, but these chokes are able to return any energy that is injected into them during commutation of the inverter switching elements with substantially no power losses thereby providing an inverter circuit capable of operation at a very high efficiency.

Figure 5:
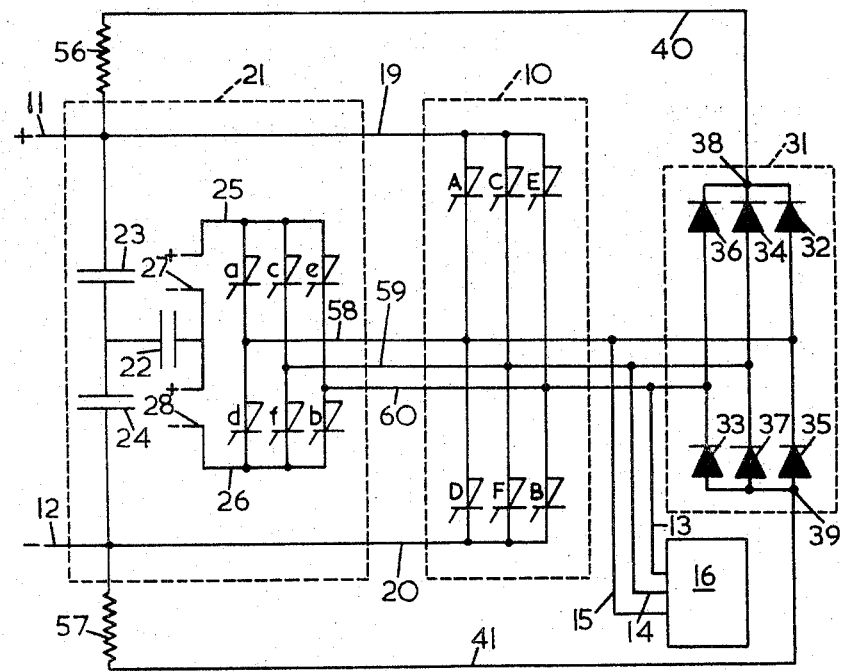
FIGURE 5 illustrates a further form of apparatus for performing the method of the invention.

The embodiment illustrated in FIGURE 5 has the inverter 10, the load 16 and the bridge rectifier 31 arranged in substantially the same manner as in FIGURE 1 with the exception that the diodes 32, 33, 34, 35, 36 and 37 of the bridge rectifier are reversed in direction and the lines 40 and 41 are connected by respective impedances 56 and 57 to the D.C. supply lines 11 and 12. The commutating circuit 21 is also of similar construction to that shown in FIGURE 1 but differs in that the commutator switching element a.c.e. is changed for three separate switching elements a, c and e arranged in parallel circuits and connected by lines 58, 59 and 60 so that a reverse voltage pulse may be applied individually to inverter switching elements A, C and E respectively. Similarly the commutator switching element d.f.b. is changed for three separate switching elements d, f and b arranged in parallel circuits for applying a reverse voltage pulse through respective lines 58, 59 and 60 to inverter switching elements D, F and B. Thus the inverter switching elements A, C and E are provided with a reverse voltage pulse from an individual series circuit 25 containing the commutating capacitor 22, the auxiliary voltage supply 27 and the appropriate commutator switching element a, c or e, and the inverter switching elements D, F and B are provided with a reverse voltage pulse from an individual series circuit 26 containing the commutating capacitor 22, the auxiliary voltage supply 28 and the appropriate commutator switching element, d, f or b.

Prior to commutating one of the inverter switching elements A, C or E, the sum of the voltages across the commutating capacitor 22 and the auxiliary D.C. supply 27 makes the potential at the common terminal of the commutator switching elements a, c and e more positive than that of D.C. supply line 11. To extinguish an inverter switching element A, C or E commutator switching element a, c or e respectively is rendered conducting thus applying a reverse voltage across the inverter switching element that is to be extinguished. The connections between lines 40 and 41 of the bridge rectifier 31 and the D.C. supply lines 11, 12 include impedances 56, 57 which allow the potentials of the A.C. phases 13, 14 and 15 to be more positive than the potential of the D.C. supply line 11 or more negative than the potential of the D.C. supply line 12 during the period when a reverse voltage must appear across the appropriate inverter switching element that is to be extinguished. When an inverter switching element A, C or E has been extinguished, the current flowing in the A.C. phase to which it is connected is transferred to the associated commutator switching element a, c or e and thus charges the commutating capacitor 22. The voltage of the latter will change such that the potential at the common terminals of the commutator switching elements a, c and e falls towards that of the D.C. supply line 12 and is finally held slightly negative to this potential by one of the return current diodes 33, 35 or 37 conducting through the impedance 57 to the D.C. supply line 12. The conducting commutator switching element is then relieved of current and regains its non-conducting state, leaving the sum of the voltages across the commutating capacitor 22, the auxiliary supply 28 and the impedance 57 such that the potential at the common terminals of the commutator switching elements d, f and b is more negative than D.C. supply line 12 in readiness for subsequent commutation of the inverter switching elements D, F or B.

With this embodiment of the invention each inverter switching element is supplied with a momentary reversal of voltage to turn it off individually and exclusively, whilst the main feature of the invention is retained in that the groups of inverter switching elements A, C, E and D, F, B are commutated alternately. Thus the firing of the commutator switching elements a, b, c, d, e and f must be co-ordinated so as to be in synchronism with the turning off of the corresponding inverter switching elements A, B, C, D, E and F. As return current diodes 32, 33, 34, 35, 36 and 37 are used, the conduction period of each commutator switching element will be a very small proportion of the conduction period of the inverter switching elements and this has the advantage that a switching element with a lower current rating may be used for the commutating duty. This reduces the cost of the extra commutator switching elements which is offset anyway by the saving achieved by not employing any chokes. As there are no chokes the associated circulating current is eliminated thus increasing the current rating of the inverter. However it should be borne in mind that small power losses will be incurred in the impedance elements 56 and 57, and that the circuit will impress rapid increases of forward voltage of the inverter switching elements which must therefore have the ability to withstand these rapid increases of voltage without firing if the embodiment is to operate satisfactorily.

If desired the commutator switching elements of FIGURE 5 may be used additionally as reverse current diodes provided that diodes performing the equivalent function of diodes 52 and 54 of FIGURE 4 are added to the circuit.

What we claim as our invention and desire to secure by Letters Patent of the United States is:

1. The combination of a commutation circuit, a bridge rectifier and a bridge inverter, including at least four switching elements of the kind that can be extinguished by applying a reverse voltage pulse across them, said switching elements arranged in two equal groups in the bridge inverter, two D.C. supply lines of different potential, said equal groups of inverter switching elements connected respectively to said D.C. supply lines, A.C. terminals for said inverter, a load having a lagging power factor adapted to be fed by said A.C. terminals, a smoothing capacitor, a first series circuit, a second series circuit, an auxiliary voltage supply, a commutator switching element arranged in each said series circuit, two commutating capacitors, one of said commutating capacitors connected between said one D.C. supply line and a point between one terminal of said auxiliary supply and the said commutator switching element in the said first series circuit, the other of said commutating capacitors connected between said other D.C. supply line and a point between the other terminal of said auxiliary supply and the said commutator switching element in the said second series circuit, said commutating capacitors and said auxiliary supply adapted conjointly to produce a reverse voltage pulse for extinguishing any of the inverter switching elements, a smoothing capacitor connected between the two D.C. supply lines, each commutator switching element adapted to be fired to complete the corresponding series circuit for supplying a reverse voltage pulse to the inverter switching element connected to that series circuit, the commutator switching elements are arranged to be fired alternately and in synchronism with the operation of the inverter so that a reverse voltage pulse is applied alternately to an inverter switching element of one of said groups and an inverter switching element of the other of said groups whereby an inverter switching element that has been turned off will be appropriately extinguished, the commutator switching elements are maintained conducting until the corresponding commutating capacitor is suitably charged ready for providing the next reverse voltage pulse, and the bridge rectifier is connected between the D.C. supply lines and the A.C. terminals of the inverter for carrying the load current during the periods when it is not supplied by the inverter.

2. The combination of a commutation circuit, a bridge rectifier and a bridge inverter, including at least four switching elements of the kind that can be extinguished by applying a reverse voltage pulse across them, said switching elements arranged in two equal groups in the bridge inverter, two D.C. supply lines of different potential, two chokes, one of said equal groups of inverter switching elements connected through one of said chokes to one of said D.C. supply lines, the other of said equal groups of inverter switching elements connected through the other of said chokes to the other of said D.C. supply lines, two circulating current paths respectively arranged in parallel with said chokes, A.C. terminals for said inverter, a load having a lagging power factor adapted to be fed by said A.C. terminals, a smoothing capacitor, a first series circuit, a second series circuit, an auxiliary voltage supply arranged in each said series circuit, a commutator switching element arranged in each said series circuit, a commutating capacitor having one plate associated with both D.C. supply lines through said smoothing capacitor and having the other plate connected by said first series circuit to said one D.C. supply line intermediate said one choke and said one group of inverter switching elements and by said second series circuit to said other D.C. supply line intermediate said other choke and said other group of inverter switching elements, said commutating capacitor and said auxiliary supplies adapted conjointly to produce a reverse voltage pulse for extinguishing any of the inverter switching elements, each commutator switching element adapted to be fired to complete the corresponding series circuit for supplying a reverse voltage pulse to the group of inverter switching elements connected to that series circuit, the commutator switching elements are arranged to be fired alternately and in synchronism with the operation of the inverter so that a reverse voltage pulse is applied alternately to each said group of inverter switching elements whereby any inverter switching element that has been turned off will be appropriately extinguished, the commutator switching elements are maintained conducting until the commutating capacitor is suitably charged ready for providing the next reverse voltage pulse, the bridge rectifier is connected between the D.C. supply lines and the A.C. terminals of the inverter for carrying the load current during the periods when it is not supplied by the inverter, and two impedances arranged one in each of said circulating current paths whereby the time constant of each of said paths is made sufficiently short as to enable the inverter to operate at high frequencies.

3. The combination of a commutation circuit, a bridge rectifier and a bridge inverter, including at least four switching elements of the kind that can be extinguished by applying a reverse voltage pulse across them, said switching elements arranged in two equal groups in the bridge inverter, each inverter switching element of one of said groups is paired with an inverter switching element of the other of said groups, a number of centre-tapped chokes corresponding to the number of pairs of inverter switching elements, the A.C. sides of each pair of inverter switching elements are connected through a respective choke, two D.C. supply lines of different potential, the D.C. sides of said equal groups of inverter switching elements connected respectively to said D.C. supply lines, A.C. terminals for said inverter provided by the centre-tappings of said centre-tapped chokes, a load having a lagging power factor adapted to be fed by said A.C. terminals, the bridge rectifier is divided into two equal portions, a first series of tappings are each arranged between the A.C. side of an inverter switching element of one of said groups and its associated choke, a second series of tappings are each arranged between the A.C. side of an inverter switching element of the other of said groups and its associated choke, a smoothing capacitor, a first series circuit, a second series circuit, an auxiliary voltage supply arranged in each said series circuit, a commutator switching element arranged in each said series circuit, a commutating capacitor having one plate associated with both D.C. supply lines through said smoothing capacitor and having the other plate connected by said first series circuit to said first series of tappings through one of said bridge rectifier portions and by said second series circuit to said second series of tappings through the other of said bridge rectifier portions, said commutating capacitor and said auxiliary supplies adapted conjointly to produce a reverse voltage pulse for extinguishing any of the inverter switching elements, each commutator switching element adapted to be fired to complete the corresponding series circuit for supplying a reverse voltage pulse to the group of inverter switching elements connected to that series circuit, the commutator switching elements are arranged to be fired alternately and in synchronism with the operation of the inverter so that a reverse voltage pulse is applied alternately to each said group of inverter switching elements whereby any inverter switching element that has been turned off will be appropriately extinguished, the commutator switching elements are maintained conducting until the commutating capacitor is suitably charged ready for providing the next reverse voltage pulse, the bridge rectifier is adapted to carry the load current during the periods when it is not supplied by the inverter, and two clamping devices are arranged respectively to clamp the second series circuit to the one D.C. supply line and the first series circuit to the other D.C. supply line.

4. The combination as in claim 3, comprising two commutating capacitors, a single auxiliary voltage supply, one of said commutating capacitors connected between said one D.C. supply line and a point between one terminal of said single auxiliary supply and the said commutator switching element in the said first series circuit, the other of said commutating capacitors connected between said other D.C. supply line and a point between the other terminal of said single auxiliary supply and the said commutator switching element in the said second series circuit, said commutating capacitors and said single auxiliary supply adapted conjointly to produce a reverse voltage pulse for extinguishing any of the inverter switching elements, and a smoothing capacitor is connected between the two D.C. supply lines.

5. The combination of a commutation circuit, a bridge rectifier and a bridge inverter, including at least four switching elements of the kind that can be extinguished by applying a reverse voltage pulse across them, said switching elements arranged in two equal groups in the bridge inverter, two D.C. supply lines of different potential, the D.C. sides of said equal groups of inverter switching elements connected respectively to said D.C. supply lines, A.C. terminals for said inverter, the A.C. side of each switching element of one of said groups is connected to one of said A.C. inverter terminals and to the A.C. side of a switching element of the other of said groups, a load having a lagging power factor adapted to be fed by said A.C. terminals, a smoothing capacitor, a first series circuit, a second series circuit, an auxiliary voltage supply arranged in each said series circuit, a commutator switching element arranged in each said series circuit, a commutating capacitor having one plate associated with both D.C. supply lines through said smoothing capacitor and having the other plate connected by said first series circuit and by said second series circuit to one of said A.C. inverter terminals, said commutating capacitor and said auxiliary supplies adapted conjointly to produce a reverse voltage pulse for extinguishing any of the inverter switching elements, a number of pairs of parallel circuits corresponding to the other A.C. inverter terminals, a separate commutator switching element arranged in series with each of said parallel circuits, the said other A.C. inverter terminals are connected by a pair of said parallel circuits to said series circuits such that each parallel circuit can receive a reverse voltage pulse irrespective of the condition of the commutator switching elements arranged in the said series circuits, each commutator switching element adapted to be fired to complete its respective circuit for supplying an individual reverse voltage pulse exclusively to the inverter switching element connected to that circuit, the commutator switching elements are arranged to be fired in synchronism with the operation of the inverter so that when an inverter switching element is to be extinguished an individual reverse voltage pulse is applied exclusively to it, the commutator switching elements are maintained conducting until the commutating capacitor is suitably charged ready for providing the next reverse voltage pulse, and the bridge rectifier is connected between the D.C. supply lines and the A.C. terminals of the inverter for carrying the load current during the periods when it is not supplied by the inverter.

6. The combination as in claim 5, comprising two commutating capacitors, a single auxiliary voltage supply, one of said commutating capacitors connected between said one D.C. supply line and a point between one terminal of said single auxiliary supply and the said commutator switching element in the said first series circuit, the other of said commutating capacitors connected between said other D.C. supply line and a point between the other terminal of said single auxiliary supply and the said commutator switching element in the said second series circuit, said commutating capacitors and said single auxiliary supply adapted conjointly to produce a reverse voltage pulse for extinguishing any of the inverter switching elements, and a smoothing capacitor is connected between the two D.C. supply lines.

References Cited

UNITED STATES PATENTS

| | | | |
|---|---|---|---|
| 3,213,287 | 10/1965 | King | 321—45 XR |
| 3,219,905 | 11/1965 | Davis et al. | 321—8 |
| 3,262,036 | 7/1966 | Clarke et al. | 318—227 XR |

JOHN F. COUCH, *Primary Examiner.*

W. SHOOP, *Assistant Examiner.*